(12) United States Patent
Benedict et al.

(10) Patent No.: US 12,124,236 B1
(45) Date of Patent: Oct. 22, 2024

(54) COMPUTER SYSTEM AND METHOD FOR ASSISTED SETUP OF INSTRUMENTED MACHINE TOOL TABLES

(71) Applicant: Beneficial Machine Tools, LLC, Fremont, CA (US)

(72) Inventors: George Benedict, Fremont, CA (US); Surinder Badyal, Ridgecrest, CA (US)

( * ) Notice: Subject to any disclaimer, the term of this patent is extended or adjusted under 35 U.S.C. 154(b) by 0 days.

(21) Appl. No.: 18/486,405

(22) Filed: Oct. 13, 2023

(51) Int. Cl.
*G05B 19/409* (2006.01)
*G05B 19/4097* (2006.01)

(52) U.S. Cl.
CPC ............ *G05B 19/4097* (2013.01); *G05B 2219/35012* (2013.01)

(58) Field of Classification Search
USPC ..................................................... 700/28
See application file for complete search history.

(56) References Cited

U.S. PATENT DOCUMENTS

| | | | |
|---|---|---|---|
| 6,580,959 B1 * | 6/2003 | Mazumder | G05B 19/4185 700/121 |
| 7,483,929 B2 | 1/2009 | Kulkarni | |
| 7,506,010 B2 | 3/2009 | Kulkarni | |
| 7,570,006 B2 * | 8/2009 | Bretschneider | G05B 19/4185 318/568.17 |
| 8,099,520 B2 | 1/2012 | Kulkarni | |
| 8,224,920 B1 | 7/2012 | Kulkarni | |
| 8,620,957 B1 | 12/2013 | Kulkarni | |
| 9,137,225 B2 | 9/2015 | Kulkarni | |
| 9,235,206 B2 | 1/2016 | Benedict | |
| 9,903,699 B2 | 2/2018 | Benedict | |
| 10,416,647 B1 | 9/2019 | Benedict | |
| 10,585,419 B1 * | 3/2020 | Benedict | G05B 19/4097 |
| 2005/0085940 A1 * | 4/2005 | Griggs | G05B 19/401 700/181 |
| 2006/0095142 A9 * | 5/2006 | Evans | G05B 19/4097 700/193 |
| 2012/0266078 A1 | 10/2012 | Kulkarni | |
| 2017/0314905 A1 * | 11/2017 | Benedict | B23Q 17/2233 |
| 2018/0375316 A1 * | 12/2018 | Greco | H02G 7/20 |
| 2019/0018391 A1 * | 1/2019 | Rogers | G05B 19/4097 |
| 2020/0125068 A1 * | 4/2020 | Trounson, III | G05B 19/40938 |
| 2021/0405611 A1 * | 12/2021 | Boswell | G06F 30/20 |
| 2022/0063016 A1 * | 3/2022 | Gabilondo | B23K 26/0626 |

FOREIGN PATENT DOCUMENTS

KR  20230032675 A  *  3/2023

\* cited by examiner

*Primary Examiner* — Hien D Khuu
(74) *Attorney, Agent, or Firm* — Knowmad Law; Christopher R. McElwain; Rudolph P. Darken

(57) ABSTRACT

A computer system and method for the assisted setup of an instrumented computer-controlled machine tool table, which in principle manufactures only good parts, is disclosed. The invention allows a plurality of users, such as machinists, designers, administrators, and showroom operators, to access and share data related to computer-assisted setup (CAS) of an instrumented computer-controlled machine tool table in a manner that is interactive in real time and internal to the CAS infrastructure architecture.

17 Claims, 9 Drawing Sheets

710

| 8-20-22 Vise Data |
|---|
| 711 — Fadal 917-1 |
| 712 — Kurt D688 |
| 713 — SPI X-Y-Z |
| 714 — 0.0 |
| 715 — 0.0 |
| 716 — 68 |
| 717 — 0.0000 |
| 717 — 0.0000 |
| 717 — 0.0000 |
| 717 — 0.0000 |
| 717 — -0.2000 |
| 717 — -0.2000 |

| 8-20-22 Vise Data |
|---|
| 721 — Fadal 917-1 |
| 722 — Kurt D688 |
| 723 — SPI X-Y-Z |
| 724 — 0.0 |
| 725 — 0.0 |
| 726 — 75 |
| 727 — -0.0009 |
| 727 — -0.0005 |
| 727 — +0.0002 |
| 727 — -0.0005 |
| 727 — -0.1998 |
| 727 — -0.2006 |

Figure 7B

| 730 | | 740 | |
|---|---|---|---|
| | 11-1-22 Block Data | | 11-1-22 Block Data |
| 731 | Fadal 917-1 | 741 | Fadal 917-1 |
| 732 | Kurt D688 | 742 | Kurt D688 |
| 733 | SPI X-Y-Z | 743 | SPI X-Y-Z |
| 734 | 0.0 | 744 | 0.0 |
| 735 | 0.0 | 745 | 0.0 |
| 736 | 68 | 746 | 65 |
| 737 | 4.6700 | 747 | 4.6712 |
| 737 | -1.700 | 747 | -1.6993 |
| 737 | 3.2000 | 747 | 3.2013 |
| 737 | -0.2000 | 747 | -0.1969 |
| 737 | 3.2000 | 747 | 3.2017 |
| 737 | -0.2000 | 747 | -0.1979 |
| 737 | 0.2000 | 747 | 0.2001 |
| 737 | -0.2000 | 747 | -0.2004 |
| 737 | 0.2000 | 747 | 0.2001 |
| 737 | -2.2000 | 747 | -2.2005 |
| 737 | 0.2000 | 747 | 0.2001 |
| 737 | -0.2000 | 747 | -0.1999 |
| 737 | 0.2000 | 747 | 0.2001 |
| 737 | -2.2000 | 747 | -2.2008 |

COMPUTER SYSTEM AND METHOD FOR ASSISTED SETUP OF INSTRUMENTED MACHINE TOOL TABLES

TECHNICAL FIELD

The present invention relates generally to manufacturing using instrumented machine tool tables and, in particular, to exchange of electronic files during computer assisted setup (CAS) of instrumented machine tool tables.

BACKGROUND OF THE INVENTION

Part manufacturing using a machine tool table typically involves a CAD-CAM based computer system with software for computer-assisted design (CAD) and computer-assisted manufacturing (CAM) as shown in FIG. 1. Parts may be "good parts," which satisfy given quality and accuracy specifications, or may be "bad parts," which do not. A designer typically uses a computer 110 with CAD program 112 to create an engineering drawing comprising a digital model of a three-dimensional part referred to as the Designer File stored in the computer 110. Typically, the digital model is analyzed using a finite element analysis (FEA) computer program to determine structural integrity, thermal integrity, and electrical integrity, as required to ensure the digital model meets the designer's requirements for part performance. Using a file sharing system 180, the Designer File is sent to a machinist with a computer 150 with CAM program 152 to provide instructions referred to as Machinist File1 stored in the computer 150.

Machinist File1 is sent to a computer numeric controlled (CNC) mill, CNC Mill1 154. The machinist uses a tool presetter 156 to measure the properties of the cutters which are used to fabricate the part from a solid blank material called a work piece. Worn out cutters may result in bad parts. The machinist may also perform routine maintenance on CNC Mill1 154 using a ballbar tester, Tester1 157. Determining when to perform such maintenance is typically decided by the machinist when there are too many bad parts being manufactured.

The machinist is responsible for setting up the CNC Mill1 154 which may include a workholding solution where a vise holds the part. During fabrication the machinist may orient the part in the vise several times. Each time the part is put back in the vise and clamped in place there is a probability that the part is not seated properly, thereby typically manufacturing a bad part. It would be desirable for the designer to design an inspection of the part for each time it is clamped back in the vice to make sure that the machinist did this properly, and hence that there are no seating failures of the part. Seating failure is often difficult for the machinist to detect because this error is so small. Proper clamping techniques, incorporated herein by reference, are described in Paul R. Yoder Jr., OPTO-MECHANICAL SYSTEMS DESIGN (CRC press 1986). Alternative workholding solutions, such as fixtures, may also reduce seating failures related to clamping and debris.

After fabrication of the part, the machinist uses a coordinate measuring machine (CMM), such as CMM1 155 depicted in FIG. 1, to determine if the part passes final inspection and is a good part. In the event that the part fails final inspection and is a bad part, there is very little chance of correlating the CMM1 155 data with the cause of the failure which may be related to a seating failure. It would be desirable for the designer to design an inspection solution to the potential seating failure problem.

During setup and fabrication, CAS processes would be desirable to allow the machinist to more accurately and efficiently set the machine tool table setup-configuration, calibrate the machine tool table positions, and determine axis directions, as well as to inspect the part in-situ. CAS methods and devices are disclosed in the following patents, each of which is incorporated herein by reference: U.S. Pat. No. 9,235,206, "Apparatus for Finding a Machine Tool Origin," U.S. Pat. No. 9,903,699, "Apparatus for the Computer Assisted Setup of a Machine Tool Table," U.S. Pat. No. 10,416,647, "Apparatus for Determining Axes for the Computer Assisted Setup of a Machine Tool Table," and U.S. Pat. No. 10,585,419, "Methods and Devices for Performing In-Situ Inspections During a Computer Assisted Setup of a Machine Tool Table." Beneficial Machine Tools LLC has developed CAS software for designers (DCAS) as well as corresponding CAS software for machinists (MCAS).

Among other things, CAS processes would also be desirable for the designer to receive near real-time information, collected using sensors and probes associated with an instrumented computer-controlled machine tool table as described in U.S. Pat. No. 9,903,699. For example, such sensors and probes may be collocated with the CNC mill chuck or spindle. Such information may include data related to the coordinate positions as well as axes directions of vises and fixtures, edge locations, indexed stops, parallels, and various features of the work piece. CAS information collected from the instrumented computer-controlled machine tool table may also include environmental data, such as temperature, data related to table tilt, and data related to table motion axis direction, as well as data related to table position calibration.

A workholding solution such as a vise or fixture can utilize a host, as described in U.S. Pat. No. 10,416,647. A host, such as a 1-2-3 setup block in a preferred embodiment, provides the data to determine a coordinate system with orthogonal axes for the computer-assisted setup of an instrumented machine tool table. It is desirable for such data to be shared by the machinist with the designer. This data would be useful for a designer using a CAD program, where the axes are typically preferred to be orthogonal.

Responsibility for setting up the machine tool table and for performing final inspections on a CMM, such as CMM1 155, and also in-situ inspections, as described in U.S. Pat. No. 10,585,419, has traditionally been with the machinist as shown in FIG. 1. CAD, CAM, and CAS methods are typically carried out on separate, siloed systems, with little integration. It would be desirable for the machinist to have the capability to communicate information back to the designer in near real-time. Furthermore, the machinist does not have the capability to perform inspections on the machine tool table 154, 164. Instead final inspection is carried out by the machinist using a coordinate measuring machine (CMM) 155, 165, thereby determining the good as well as the bad parts. It would be desirable to only manufacture good parts.

Cloud computing offers a number of solutions for exchange of files among users. For example, Amazon Web Services (AWS) provides both a file server system, Amazon FSx, and a file storage system, Amazon S3. Cloud storage service providers, such as iDrive, Inc. provide file sharing services, which, among other features, allow users to synchronize files between multiple devices.

Artificial intelligence (AI), data processing automation, and/or related technologies can be incorporated into cloud-based file storage and file exchange solutions, resulting in an integrated cloud infrastructure sometimes described as "Enterprise 4.0." Solutions built on Enterprise 4.0 technology aim to improve existing workflows through automation, decentralization, and data analysis. For example, as described in U.S. Pat. No. 10,585,419, various CAS processes may be implemented by means of a voice-controlled virtual assistant, such as the "Cassie" program developed by Beneficial Machine Tools LLC, which may in turn incorporate artificial intelligence (AI) algorithms in the cloud.

A computer system for assisted setup of instrumented machine tool tables is useful to incorporate existing cloud-based file sharing solutions including AI, into CAS processes to enable designers, machinists, and other users to manufacture only good parts.

SUMMARY OF THE INVENTION

The present invention provides a computer system and method for computer-assisted setup (CAS) of instrumented machine tool tables. Using this invention, instrumented machine tool tables in principle can manufacture only good parts. The invention allows a plurality of users, such as machinists, designers, administrators, and showroom operators, to access and share CAS related data in a manner that is interactive in near real-time and internal to the CAS infrastructure architecture. Among other advantages, the invention allows designers to design Inspection Prior To Fab (IPTF) of the digital model of the part as well as the part, design in-situ inspections and design adjustments during setup of instrumented computer-assisted machine tool tables, and also during fabrication, leading to improved part accuracy, quality, and design for manufacture, as well as fewer work piece fabrication errors. It also eliminates both the tool presetters and the ballbar testers, as well as the CMM-based final inspection because only good parts, which also meet the designer's requirements for part performance, are manufactured by good cutter tools with known instrumented machine tool table axis directions and known instrumented machine tool table coordinates.

The computer system disclosed herein includes a first computer having CAD functions and associated with a first user, such as a designer, a second computer having CAM functions and associated with a second user, such as a machinist, and an instrumented computer-controlled machine tool table having at least one sensor for measuring the physical state of the instrumented computer-controlled machine tool table and coupled to the second computer.

The system further includes a third computer and a fourth computer. For example, the third computer and fourth computer may be Remote Personal Computers (RPCs) associated with the designer user and machinist user, respectively, which these users access using Remote Desktop Protocol (RDP). The instrumented computer-controlled machine tool table is configured to receive input from the second computer and configured to transmit data related to the physical state of the instrumented computer-controlled machine tool table to the second computer. The second computer is configured to transmit data related to the physical state of the instrumented computer-controlled machine tool table to the fourth computer; the fourth computer is configured to transmit data related to the physical state of the instrumented computer-controlled machine tool table to the third computer; and the third computer is configured to transmit data related to the physical state of the instrumented computer-controlled machine tool table to the first computer.

In various embodiments, this same system may also be used by a designer user to connect with and/or control multiple instrumented computer-controlled machine tool tables. For example, the system may further include a fifth computer having CAM functions and associated with a third user, such as a second machinist. In this embodiment, the system also includes a second instrumented computer-controlled machine tool table having at least one sensor for measuring the physical state of the instrumented computer-controlled machine tool table and coupled to the fifth computer. It also includes a sixth computer, such as an RPC associated with the second machinist user. The second instrumented computer-controlled machine tool table is configured to receive input from the fifth computer and configured to transmit data related to the physical state of the instrumented computer-controlled machine tool table to the fifth computer; the fifth computer is configured to transmit data related to the physical state of the instrumented computer-controlled machine tool table to the sixth computer; the sixth computer is configured to transmit data related to the physical state of the instrumented computer-controlled machine tool table to the third computer; and the third computer is configured to transmit data related to the physical state of the instrumented computer-controlled machine tool table to the first computer.

In various embodiments, the system may further include a non-transitory computer readable storage medium with instructions, executed by at least one of the first computer or the second computer, to transmit a CAD data file from the first computer to the second computer, control the instrumented computer-controlled machine tool table according to the CAD data file, receive a machine tool table state data set comprising data from the at least one sensor on the instrumented computer-controlled tool table, and transmit the machine tool table state data set to the first computer.

The present invention also provides a method for setting up an instrumented machine tool table. Initially, an electronic file is stored on a computer associated with a user, such as a designer. The file is transmitted to a second computer coupled to an instrumented computer-controlled machine tool table. Operation of the instrumented computer-controlled machine tool table is then at least partially determined by the file.

For example, the file may comprise data related to fabrication of a part, such as data related to the part, the work piece, or the workholding solution. In various embodiments, the file may comprise a CAD engineering drawing, which may be converted into a digital image formatted file, such as JPEG. The CAD engineering drawing may also be used to define a digital model of the part, wherein the finite element analysis (FEA) determines part performance integrity.

In various embodiments, status data may then be collected from the instrumented computer-controlled machine tool table and stored on a second file on the second computer. The file is then transmitted to the first computer.

For example, the status data stored on the second file may comprise coordinate data related to the work piece, workholding solution, or machine tool table setup-configuration, data files regarding inspection or quality standard specifications, environmental data, and/or data collected from probes and sensors located on the instrumented machine tool table.

A critical aspect of the present invention is a "closed-loop" feedback system for the collection of data from the remote instrumented machine tool table, wherein the data is integrated with the design specification of a part to be machined and communicated back to the designer. This feedback system allows the designer to accurately predict if the part produced under the current conditions will meet specified accuracy tolerances as well as quality control standards. The collection of the data (disclosed in U.S. Pat.

No. 10,416,647) the bi-directional closed-loop feedback system communication mechanism (disclosed herein), and the display and augmentation of that data to include predictive computing processes assist the designer in accurately guiding the remote machinist. The machinist may also be interacting with a virtual assistant. The foregoing features lead to a successful result and are important elements of the present invention.

For a better understanding of the present invention, its functional advantages and the specific objects attained by its uses, reference should be made to the accompanying drawings, claims and descriptive matter in which there are illustrated embodiments of the invention.

BRIEF DESCRIPTION OF THE DRAWINGS

FIG. 7A is a representation of a designer text file comprising vise inspection data.

FIG. 7B is a representation of a machinist text file comprising vise inspection data.

FIG. 7C is a representation of a designer text file comprising block inspection data.

FIG. 7D is a representation of a machinist text file comprising block inspection data.

DETAILED DESCRIPTION

The following detailed description is of the best currently contemplated modes of carrying out various embodiments of the invention in which said embodiments can be carried out independently and/or in combination. The description is not to be taken in a limiting sense but is made for at least the purpose of illustrating the general principles of the invention, since the scope of the invention is best defined by the appended claims.

Figure 1:
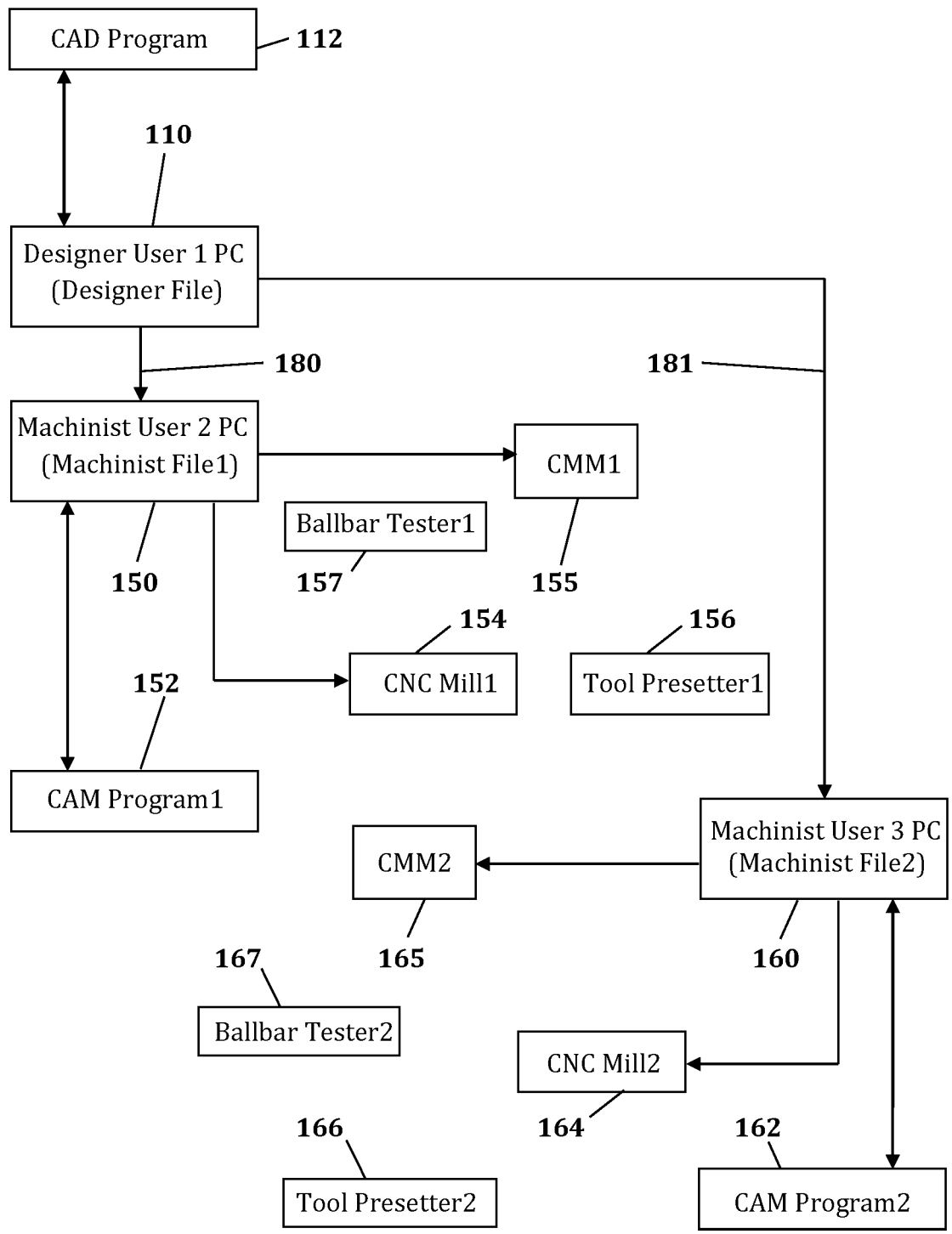
FIG. 1 is a CAD-CAM based computer system for a designer to fabricate parts.

The present invention allows a user, such as a designer, to share a designated file in near real-time with a second user, such as a machinist, or, alternatively, to share the file in near real-time with a plurality of other users. For example, the invention allows a machinist to share files with the designer during manufacture of the designer's part, so that the designer may design in-situ inspections of the part being fabricated on an instrumented machine tool table.

Where a machinist and a designer are operating computers connected to the same local network, sharing files may be straightforward. For example, as illustrated in FIG. 1, a computer associated with a designer user 110 may connect directly to a computer associated with a machinist user 150 in order to exchange or synchronize files 180.

Figure 2:
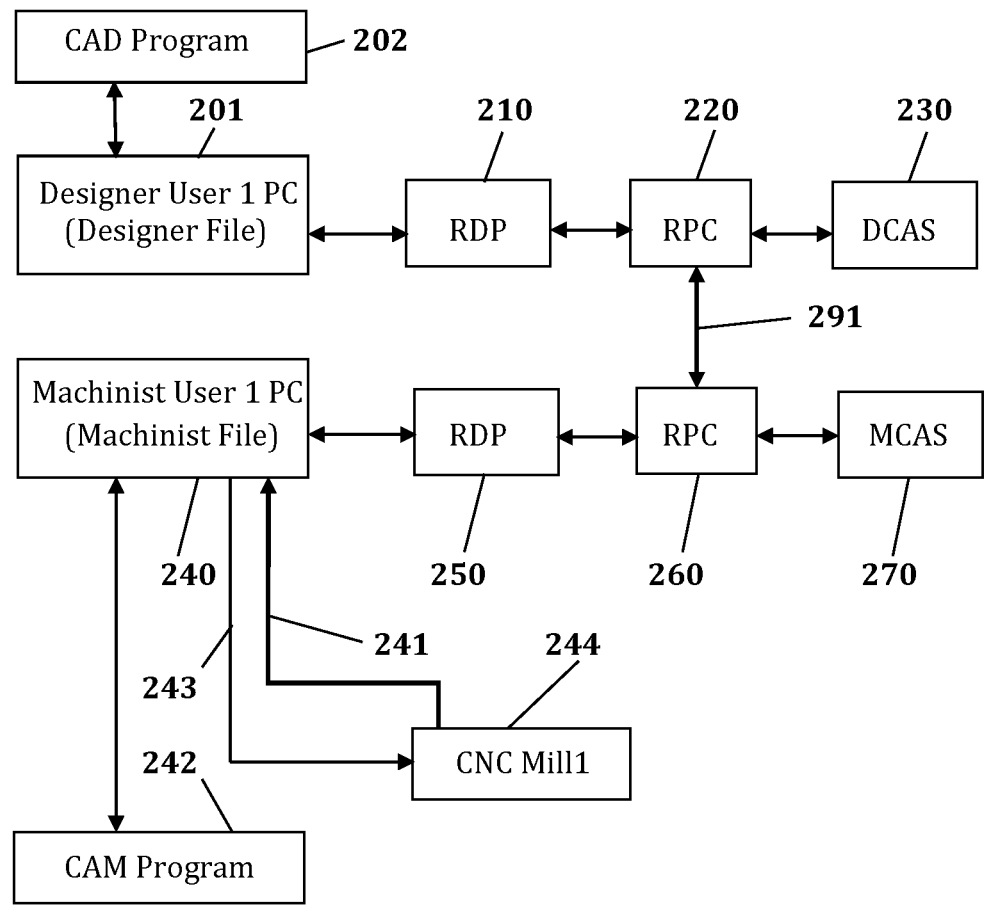
FIG. 2 is a CAS based computer system for a designer to fabricate parts.
Figure 2:
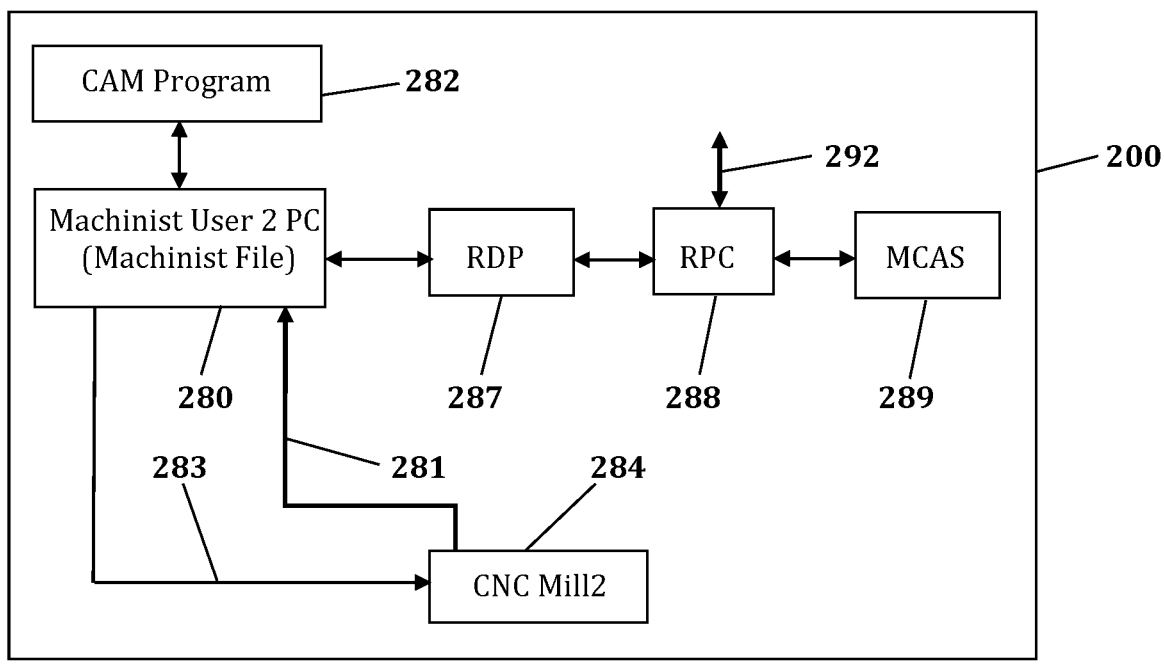

In practice, however, designer and machinist users are typically situated in different locations during the fabrication process and are often interacting remotely with computer systems. For example, it is common for users to access CAS software using a remote desktop protocol (RDP). As illustrated in FIG. 2, RDP 210, 250 allows a user to access a remote personal computer (RPC) 220, 260, giving the user access to remotely stored resources such as software and files. For example, CAS software applications such as DCAS 230 or MCAS 270 may be installed on an RPC and executed remotely. The RPC can also connect to a cloud-based digital network 291.

FIG. 2 illustrates a computer system according to the present invention. This computer system includes a first computer 201 having CAD program functions 202 and a second computer 240 having CAM program functions 242. The first computer and the second computer may be associated with a designer and machinist, respectively, and are referred to herein for convenience as "Designer User 1 PC" and "Machinist User 1 PC." Designer User 1 PC 201 is coupled to a third computer 220 via a digital network, while Machinist User 1 PC 240 is coupled to a fourth computer 260 via a digital network. In various embodiments, the third computer 220 may be an RPC accessed by Designer User 1 via an RDP connection 210, while the fourth computer 260 may be an RPC accessed by Machinist User 1 via an RDP connection 250. The second computer 240 is coupled to the first computer via a cloud based digital network 291 and further coupled 243 to an instrumented computer-controlled machine tool table 244 having at least one sensor for measuring the physical state of the instrumented computer-controlled machine tool table 244, whereby data provided by the sensor may be transmitted to the second computer 240. The second computer 240 is configured to receive input from the first computer 201, and the instrumented computer-controlled machine tool table 244 is configured to receive input from the second computer 240.

In the computer system of the present invention, Machinist User 1 PC 240 is further coupled to an instrumented computer-controlled machine tool table 244 having at least one sensor for measuring the physical state of the instrumented computer-controlled machine tool table. The instrumented computer-controlled machine tool table is configured to receive input 243 from Machinist User 1 PC 240 and configured to transmit data 241 related to the physical state of the instrumented computer-controlled machine tool table back to Machinist User 1 PC 240. Machinist User 1 PC 240 is configured to transmit data, such as data related to the physical state of the instrumented computer-controlled machine tool table, to the fourth computer 260; for example, such data may be transmitted to the RPC 260 accessed by Machinist User 1 via RDP 250. The machinist RPC or other fourth computer 260 is configured to transmit data 291 to the designer RPC 220 or other third computer. Finally, the third computer 220 is configured to transmit data to Designer User 1 PC 201; for example, the data may be transmitted to Designer User 1 PC 201 by the RPC 220 accessed by Designer User 1 via RDP 210.

An RPC accessed through RDP may be a physical computer or a virtual machine (VM). In the case of a VM, an emulation of a computer system, referred to herein as an "instance," is created on a remote server. For example, Amazon Elastic Compute Cloud (Amazon EC2) allows users to access cloud-based RPC instances emulating a Microsoft Windows operating environment.

FIG. 2 also illustrates an embodiment of this computer system which includes a fifth computer 280 having CAM functions 282. This fifth computer may be associated with a second machinist user and is referred to herein for convenience as "Machinist User 2 PC." In this embodiment, Machinist User 2 PC 280 is coupled to a second instrumented computer-controlled machine tool table 284 having at least one sensor for measuring the physical state of the instrumented computer-controlled machine tool table. In this embodiment, the computer system also includes a sixth computer 288, such as an RPC which Machinist User 2 accesses via RDP 287. The second instrumented computer-controlled machine tool table 284 is configured to receive input 283 from Machinist User 2 PC 280 and configured to transmit data 281 related to the physical state of the instrumented computer-controlled machine tool table to Machinist User 2 PC 280. Machinist User 2 PC 280 is configured to transmit data, such as data related to the physical state of the instrumented computer-controlled machine tool table, to the second machinist's RPC 288 or other sixth computer. The sixth computer 288 is configured to transmit data 292 to the designer RPC 260 or other third computer. Finally, the third computer 220 is configured to transmit data to Designer User 1 PC 201.

Figure 4:
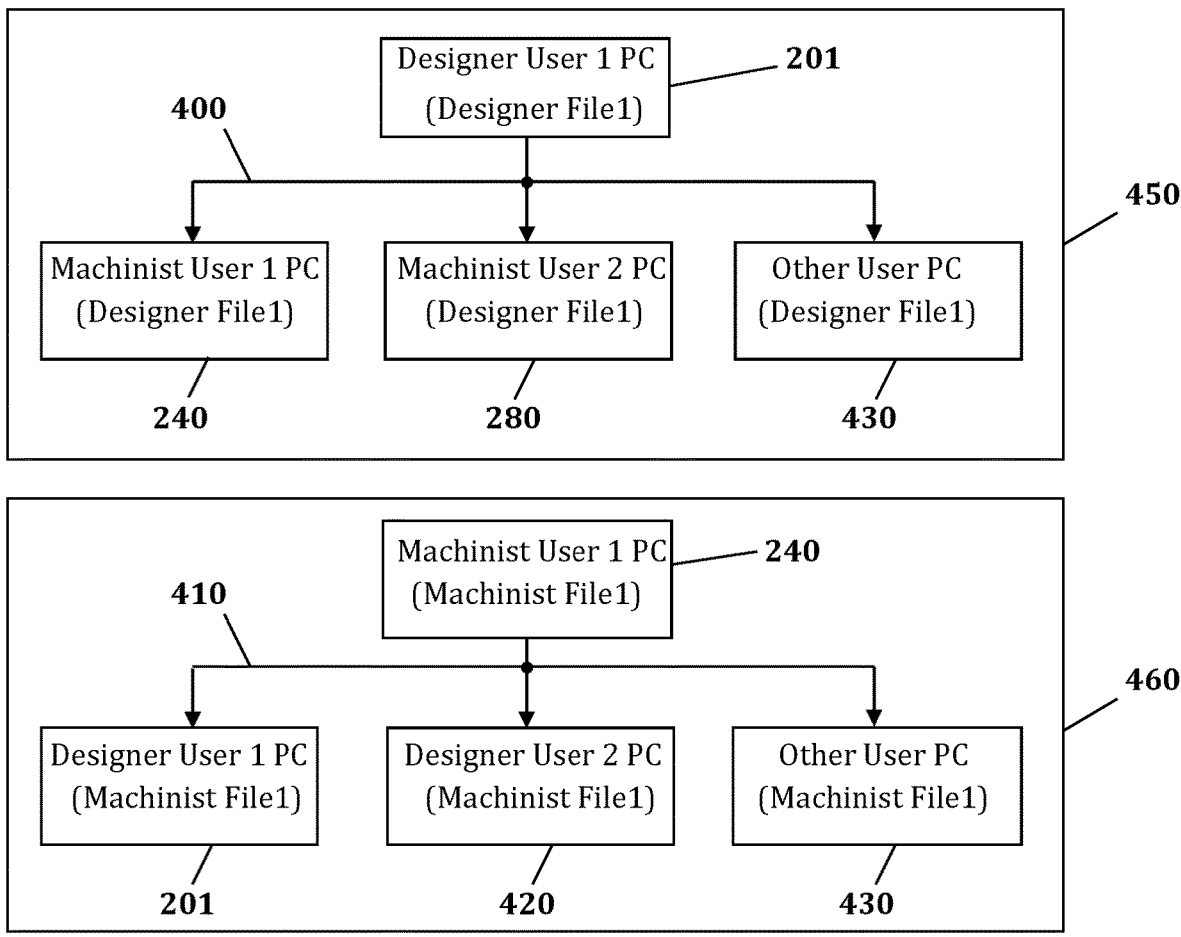
FIG. 4 is a diagram of the bi-directional file sharing system for a plurality of users.

FIG. 4 illustrates the bi-directional use of the present invention. In one direction 450, a designer shares a file designated "Designer File1" with three other users. In this embodiment, the file is stored on a computer associated with the designer, Designer User 1 PC 201. Designer User 1 PC 201 provides access to Designer File1 to three other computers associated with three other users via a cloud based digital network 400: Machinist User 1 PC 240, Machinist User 2 PC 280, and Other User PC 430. The data embodied in Designer File1 is thus accessible in near real-time.

In the other direction 460, the machinist shares a file designated "Machinist File1" with three other users. In this embodiment, a file is stored on a computer associated with the machinist, Machinist User 1 PC 240. Machinist User 1 PC 240 provides access to Machinist File1 to three other computers associated with three other users via a cloud-based digital network 410: Designer User 1 PC 201, Designer User 2 PC 420, and Other User PC 430. The data embodied in Machinist File1 is thus accessible in near real-time. It is anticipated that the cloud-based digital network 400 used by the designer and the cloud-based digital network 410 used by the machinist may comprise the same network.

Figure 5:
FIG. 5 is a representation of a file comprising text data.

Designer File1 and Machinist File1 represent electronic files that may comprise a variety of data and file types. For example, FIG. 5 depicts an embodiment of the present invention in which Designer File1 is a file comprising text data 510, 520, 530. For example, the file comprising text data may be a text file with file extension .txt or a rich text box format file with file extension .rtf. In various embodiments, Designer File1 may be a text file comprising a plurality of text values. The text data may be in English, as shown in element 520, or in a foreign language such as Mandarin, as showing in element 530.

Figure 6:
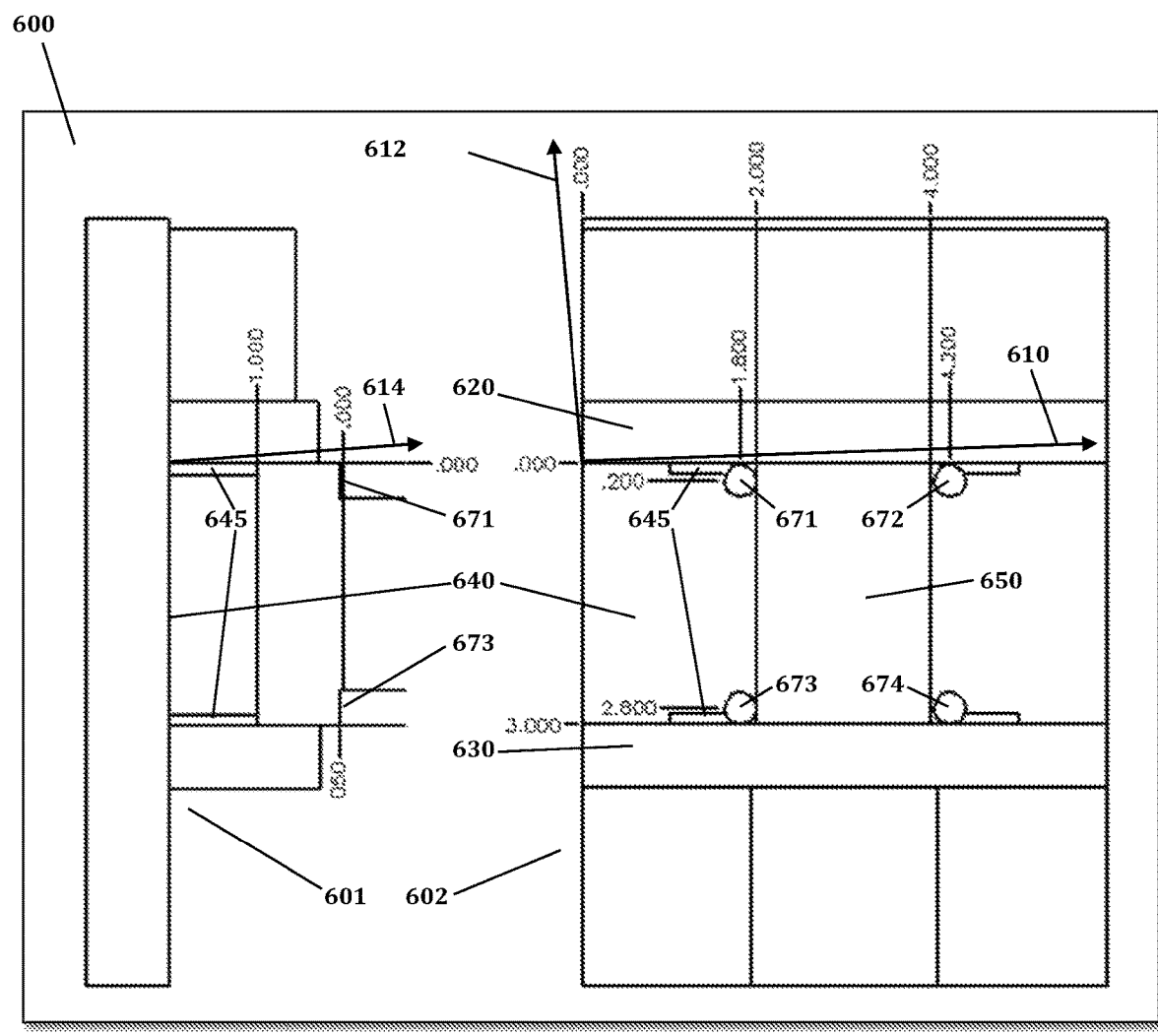
FIG. 6 is a representation of a file comprising data related to a CAD engineering drawing.
Figure 6:
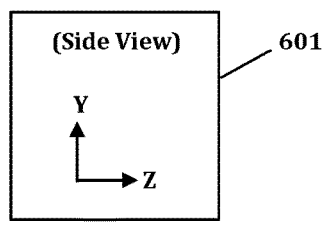
Figure 6:
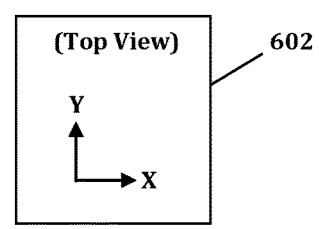

FIG. 6 depicts an embodiment of the present invention in which Designer File1 is a file 600 comprising data related to an engineering drawing generated by CAD software. For example, Designer File1 600 may be a file generated by AutoDesk AutoCAD with file extension .dxf or .dwg.

Working with CAD files generated by competing CAD software programs often leads to compatibility problems. For example, a file generated by Dassault SolidWorks CAD software may not be fully accessible to a user using AutoDesk AutoCAD. Therefore, in various embodiments of the present invention, Designer File1 600 may be converted to a digital image format such as JPEG. Use of such digital image formats also has the advantage of facilitating compatibility between various CAD, CAM, and CAS software programs.

In various embodiments, Designer File1 may also comprise video data. Video files may be generated by CAD software. For example, the CAD program SolidWorks enables users to encode video files in Windows Media Video (WMV) format. By sharing video files with machinists and other users during the setup and/or fabrication processes, a designer may be able to illustrate various CAS processes and solutions to problems that commonly arise during manufacturing. For example, video files may be used by a designer to illustrate the CAS procedure, described below, by which a cutting tool path may be refined to account for cutting tool wear.

As illustrated in FIG. 6, in various embodiments, Designer File1 600 may comprise data representing three-dimensional objects, such as orthographic representations of a machine tool table setup-configuration by means of a side view 601, having a z axis and y axis, and a top view 602, having an x axis and y axis. Different colors may be used to represent different objects such as axes directions, vises, fixtures, the part being fabricated, and probe positions.

With respect to the file 600 depicted in FIG. 6, both the top view and side view comprise visual representations of a machine tool table vise, including a fixed vise jaw 620, a clamping jaw 630, and vise floor 640. The file also shows a 1-2-3 setup block 650, which sits on parallels 645 on the floor of the vise 640, and is clamped up against the fixed jaw 620, by the clamping jaw 630. In other embodiments, the file may comprise data depicting alternative workholding solutions, such as custom fixtures.

Designer File1 600 may further comprise data representing measurement positions 671, 672, 673, and 674, which correspond to data embodied in files stored by Machinist User 1 PC 240. As discussed in greater detail below, this machine tool table position measurement data may be collected by probes or sensors associated with the machine tool table, such as sensors and probes collocated with the CNC mill chuck or spindle, as described in U.S. Pat. No. 9,903,699.

Designer File1 600 may further comprise data related to x axis motion direction 610, y axis motion direction 612, and/or z axis motion direction 614, the values of which may diverge from the mutually orthogonal axes specified in the top view 601 or side view 602 represented in the engineering drawing. As described in U.S. Pat. No. 10,416,647, this data may comprise raw values corresponding to data collected from the machine tool table or may comprise refined values calculated by CAS software. Incorporating said axis elements 610, 612, 614 into an orthographic representation, embodied in a shared file 600, allows a user to access and visualize the differential values between the raw or refined axis direction and the orthogonal axes that define the orthographic views 601, 602 represented in the file 600. In various embodiments, said differential values may be magnified in order to better enable the user to visualize the axis alignment. For example, the motion axis directions 610, 612, 614 may be increased by a factor of 100× relative to the view axis in order to make the axis directions visually perceptible to the user.

FIGS. 7A and 7B illustrate use of the present invention to exchange CAS data. Using DCAS software 230, Designer User PC 1 201 generates and stores a Designer Vise Inspection File 710, comprising desired vise inspection data corresponding to the machine tool table positions represented in the CAD file 600 depicted in FIG. 6. For example, the Designer Vise Inspection File 710 may comprise 6 measurement values 717. The Designer Vise Inspection File 710 is then shared with Machinist User PC 1 240, which uses MCAS software 270, to generate and store a Machinist Vise Inspection File 720, comprising raw vise inspection data using the DRO (digital readout) values associated with the CNC Mill. For example, Machinist Vise Inspection File 720 may comprise the table temperature value 726 and measurement values 727 determined by raw data collected from machine tool table probes positioned at designated DRO points, such as points 671, 672, 673, 674 specified in a CAD file 600, wherein each desired value corresponds to a measurement point specified by the Designer Vise Inspection File 710.

Designer Vise Inspection File 710 and Machinist Vise Inspection File 720 may also include additional data, such as CNC mill model 711, 721 (e.g. Fadal 917-1), vise model 722, 723 (e.g. Kurt D688), probe information 713, 723 (e.g. SPI X-Y-Z), x axis tilt 714, 724 (e.g. 0.0), and y axis tilt 715, 725 (e.g. 0.0).

Designer Vise Inspection File 710 and Machinist Vise Inspection File 720 data specify and determine desired values and raw values, respectively. Refined values are calculated from raw values by the CAS processes (both DCAS and MCAS) using a mathematical model, as described in U.S. Pat. No. 9,903,699. Residuals can now be calculated as the error between the refined values and the desired values.

In other embodiments, files analogous to Designer Vise Inspection File 710 and Machinist Vise Inspection File 720 may comprise data related to the coordinate positions of non-vise workholding fixtures.

FIGS. 7C and 7D illustrate another use of the present invention to exchange CAS data. Using DCAS software 240, Designer User PC 1 201 generates and stores a Designer Block Inspection File 730, comprising block inspection data related to the machine tool table positions represented in the CAD file 600 depicted in FIG. 6. For example, Designer Block Inspection File 730 may comprise the table temperature value 746 and 14 measurement values 737. The Designer Block Inspection File 730 is then shared with Machinist User PC 1 240, which uses MCAS software 270, to generate and store a Machinist Block Inspection File 740, comprising raw block inspection data. For example, Machinist Block Inspection File 740 may comprise raw measurement values 747 determined by data collected from machine tool table probes positioned at designated points using the DRO (digital readout) values associated with the CNC Mill, such as points 671, 672, 673, 674 specified in a CAD file 600, wherein each value corresponds to a measurement point specified by the Designer Block Inspection File 730.

As described in U.S. Pat. No. 9,903,699, for the mathematical model, the use of measurement points 671, 672, 673, 674 can determine the residuals for the actual positions of the 1-2-3 setup block 650, to within ±0.0002 inches at a temperature of 68° F.

In other embodiments, files analogous to Designer Block Inspection File 730 and Machinist Block Inspection File 740 may comprise data related to the coordinate axes and coordinate positions of workholding fixture elements, such as host data related to a 1-2-3 setup block as described in U.S. Pat. No. 10,416,647.

In various embodiments, data generated in connection with DCAS and MCAS software may also comprise environmental data, such as machine shop temperature, humidity, or table tilt. Said data may be collected using environmental sensors, as described in U.S. Pat. No. 9,903,699. Access to environmental data allows users, such as designers, to take into account factors, such as expansion and contraction, that may affect the accuracy in part manufacture.

In various embodiments, data generated in connection with DCAS and MCAS software may also comprise data related to the position of the origin. As described in U.S. Pat. No. 9,235,206, the position of the origin may be determined to within ±0.0002 inches using a probe available from Swiss Precision Industries, number 98-316-3, referred to herein as the SPI X-Y-Z probe.

The present invention addresses a number of problems faced by designers, machinists, and other users during machine tool table setup and part fabrication.

For example, referring to FIGS. 7C and 7D, the actual position of the 1-2-3 block 747 differs from the designer's desired position 747. One of the reasons for this discrepancy may be that the temperature of the machine shop 746 is different from the design temperature of 68° F. 736. The discrepancy may also be caused by debris on the fixed jaw 620, the parallels 645, or the floor 640, which debris is not accounted for in the data embodied in files associated with Designer User PC 1 201.

The discrepancy may also be the result of a "seating failure" caused by the clamping force applied by clamping jaw 630, which may tend to lift the 1-2-3 block 650 away from the parallels 645. In the event that a user is made aware of a seating failure during fabrication, it may be possible to address the problem through known clamping techniques.

Further, the invention facilitates determination of optimum workholding solutions and design of custom workholding fixtures and solutions. Based on data made accessible through the present file sharing system, a user can evaluate alternative workholding solutions and determine the optimum configuration and/or improve custom fixture designs. These processes may be implemented with the assistance of Cassie and/or AI algorithms. However, the processes may also benefit from application of a user's common sense or "human intelligence" (HI) to correct flaws resulting from AI analysis.

In the prior art, workholding solutions are typically determined by a machinist. The system and method described herein allows workholding solutions to be defined by the designer.

As described in U.S. Pat. No. 10,416,647, the raw and/or refined axis values for the machine tool table x axis direction 610, y axis direction 612, or z axis direction 614 often diverge from the mutually orthogonal axes specified in engineering drawing views 601, 602. Making this information available to the designer in near real time allows the designer to account for the misalignment, improving accuracy during setup and fabrication.

Similarly, the designer must also account for the fact that the diameter of the cutting tool becomes smaller as the tool cuts material, thereby changing the desired position of the fabricated part. Using CAS, a machinist may collect near-real-time data related to the radial and axial locations of cutting tools. Providing the designer with access to this data allows adjustments to be made in order to account for wear. For example, as described in U.S. Pat. No. 10,585,419, residual values may be calculated by comparing actual positions to desired positions. Based on these residual values, offsets for a cutting tool path may be calculated and the cutting tool path determined to within ±0.0002 inches.

By providing the designer with near-real-time data regarding the factors discussed above, the present invention allows the designer to achieve much greater accuracy in part manufacturing. Furthermore, as described in U.S. Pat. No. 10,585,419, serial inspection can be conducted in-situ, and adjustments can be made prior to completion of each fabrication process step. For example, data can be collected by machine tool table sensors and probes at intervals corresponding to the time sequenced steps (TSS) performed by the machinist. As a result, the machinist is in principle not capable of making a bad part because errors can be identified and resolved prior to each fabrication step.

Another advantage of the present invention relates to recovery from an earthquake. As described in U.S. Pat. No. 9,903,699, a table tilt sensor may be used in the installation of a machine tool table to set the table tilt to zero degrees in the x axis and y axis directions. Periodic measurements collected by the table tilt sensor may detect a change in table tilt to non-zero, which may be caused by an earthquake that shifts the machine shop floor. Said table tilt measurements may be stored and accessed by users according to the present invention, assisting in faster and more cost-effective recovery from an earthquake.

In the event of an earthquake, use of the CNC mill should be stopped immediately and the table tilt set back to zero degrees in the x axis and y axis directions. The present invention enables a machinist and designer to then share data for purposes of ensuring that recovery from an earthquake has been successful. As discussed above, the present invention allows Designer User 1 PC 201 to provide access to a Designer Vise Inspection File 710 or Designer Block Inspection File 730, which files may comprise data related to specified inspection points 717, 737, which points may correspond to points in an engineering drawing 600 such as points 671, 672, 673, 674. The present invention further allows Machinist User 1 PC 240 to provide access to a Machinist Vise Inspection File 720 or Machinist Block Inspection File 740. The data in Machinist Vise Inspection File 720 can thereby be evaluated against the data in Designer Vise Inspection File 710, and the data in Machinist Block Inspection File 740 can likewise be evaluated against the data in Designer Block Inspection File 730. If deviations in the data are within tolerance, a machinist, designer, or other user may conclude that recovery from an earthquake has been successful.

Furthermore, data in Machinist Block Inspection File 740, shared by a user such as Machinist User 1 PC 240, may be used by a second user such as Designer User 1 PC 201 to determine table axis directions 610, 612, 614, completing the earthquake recovery process. If fabrication of a part was in process, fabrication may then be resumed, beginning with the most recent TSS.

A further advantage of the present invention is to facilitate integration of CAS processes with Enterprise 4.0 cloud technology. For example, in various embodiments, the file sharing system and methods disclosed herein may be combined with artificial intelligence (AI) algorithms and/or a voice-controlled virtual assistant, such as "Cassie" as described in U.S. Pat. No. 10,585,419, leading to additional advantages. For example, AI may be used to perform complex comparisons during the design for manufacturability (DFM) process in order to determine the optimum cost of manufacturing a part. AI can also be used to optimize the quality standard called Cpk, which relies on calculations of standard deviation during the manufacture. The present invention allows a designer to calculate Cpk in real-time during manufacture and to adjust Cpk specifications and/or accuracy specifications prior to completion of the fabrication process. Furthermore, these activities may be automated using a virtual assistant, such as the "Cassie" program discussed above. For example, Cassie can choose the optimum machine tool table setup-configuration required for each step of the manufacture specified by the designer.

Figure 3:
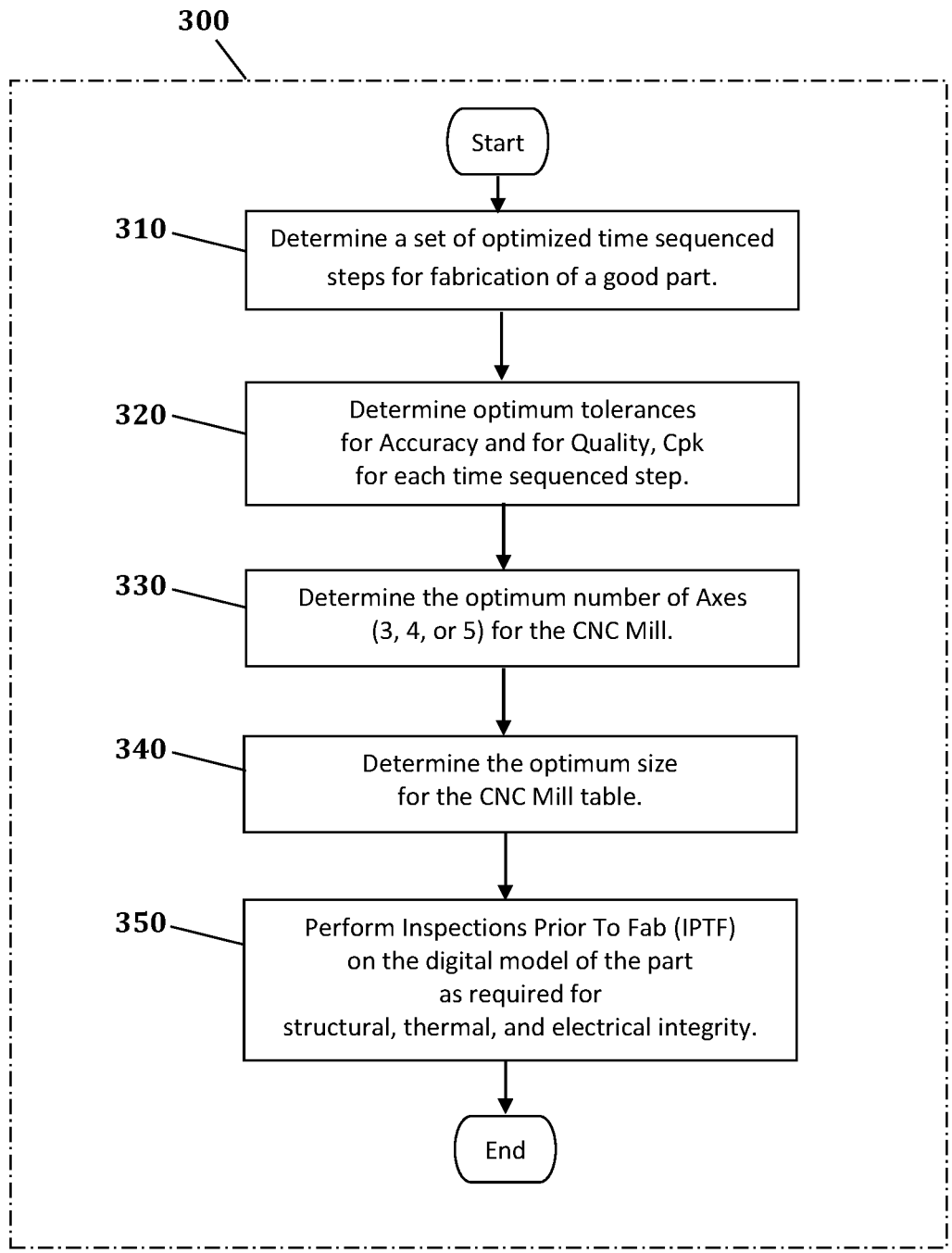
FIG. 3 is a method using artificial intelligence to determine a good part.

FIG. 3 is an execution diagram illustrating a method for optimal determination of various factors relevant to fabricating good parts. The described method may be facilitated by the present invention. According to this method, determinations are made, preferably using AI, in the following sequence: first, a set of optimized time sequenced steps for fabrication of a good part are determined 310; then, optimum tolerances for accuracy, quality, and Cpk for each time sequenced step are determined 320; then optimum number of axes (3, 4, or 5) for the CNC Mill are determined 330; then optimum size for the CNC Mill table is determined 340; last, IPTF finite element analysis (FEA) inspections are performed on a digital model of the part as required for structural, thermal, and electrical integrity 350, thereby ensuring that the designer's requirements for part performance are met. Using this method, good parts may have up to ten times better accuracy, improved quality Cpk, and meet the definition of design for manufacturing; hence they have low cost.

Among other things, the present invention facilitates the method described in FIG. 3 by enabling a designer to select amongst multiple machine tool tables. For example, as illustrated in FIG. 2, a designer using RPC 220 may control both CNC Mill1 244 and CNC Mill2 284. CNC Mill1 244 and CNC Mill2 284 may have different properties. For example, CNC Mill1 244 may be a three-axis machine tool table, and CNC Mill2 284 may be a five-axis machine tool table. Likewise, CNC Mill1 244 and CNC Mill2 284 may be different sizes. Using the AI optimization method described in FIG. 3 to determine the optimum number of axes 330 and optimum table size 340, the designer can identify a machine tool table with optimum properties for manufacturing a good part.

A further advantage of the present invention is to optimize simultaneous fabrication of multiple parts. It is envisioned that the present invention may be used by a plurality of designers, utilizing a plurality of machinists operating a plurality of CNC Mills to fabricate a plurality of parts. For example, a first designer 201 may desire to fabricate a first part, and a second designer 420 may desire to fabricate a second part. A machinist 240, exchanging data with the first and second designer by means of the present invention, may use CAS processes, such as those disclosed in U.S. Pat. No. 10,585,419, to design a single set of AI-optimized time sequenced steps to fabricate both the first part and second part. Combining fabrication of the two parts may result in significantly lower DFM cost relative to fabricating each part separately. Among other efficiencies, the two parts can be parted from a single work piece, using a single workholding solution. In addition, certain steps, such as testing for seating failure and loading cutting tools and probes into the chuck, need only be performed once. Further combining fabrication of additional parts for additional users may lower costs further.

The present invention also addresses a problem which may be encountered when using AI to determine time sequenced steps to simultaneously fabricate multiple parts. AI algorithms are said to exhibit "emergent behavior" when they generate unexpected outcomes, the causes of which aren't apparent to human users. For example, in the case of AI-assisted CAS processes, the AI program may exhibit an emergent behavior in which the AI determines that a third part, desired by a third designer, can be fabricated from the waste material or odd-shaped work piece remaining following fabrication of a first part and second part, desired by a first designer and second designer respectively. The DFM cost for this third part is thus drastically reduced relative to fabricating the part independently, with the unintended consequence that fabrication costs among separate designers may be allocated inequitably. The present invention addresses this issue by allowing data related to fabrication of these parts to be shared in near real time with a third-party user, such as an administrator or machine shop owner. This additional user can use common sense to suggest ways to more fairly allocate fabrication costs among a plurality of designers.

Another advantage of the present invention is allowing designers and machinists to share files with a plurality of other users. Referring to FIG. 4, Designer User 1 PC 201 shares Designer File1 with Other User PC 430. Other User PC 430 may be associated with an administrator providing customer support for the DCAS software, and providing Other User PC 430 with access to Designer File1 would thus assist in troubleshooting.

In other cases, referring again to FIG. 4, Other User PC 430 may be associated with a CNC milling machine showroom. In this case, providing Other User PC 430 with access to Designer File1 may allow a designer to test alternative CNC mills differing in various features, such as number of axes (e.g. 3-axis machines, 4-axis machines, and 5-axis machines) and table size, as well as testing alternative machine tool table setup-configurations. Since CNC mill selection is a critical factor in DFM optimization, the ability to compare alternative mills is highly desirable. At the same time, milling machine distributors, as well as providers of other manufacturing hardware and software, may benefit from the ability to showcase their products to designers.

The invention may also be used to a share video file with a showroom user for promotional or informational purposes. For example, the file may comprise video illustrating capabilities of particular hardware or software products related to CAD, CAM, or CAS. Sharing the file with a showroom user would facilitate display of this information to potential buyers located in the showroom.

Figure 8:
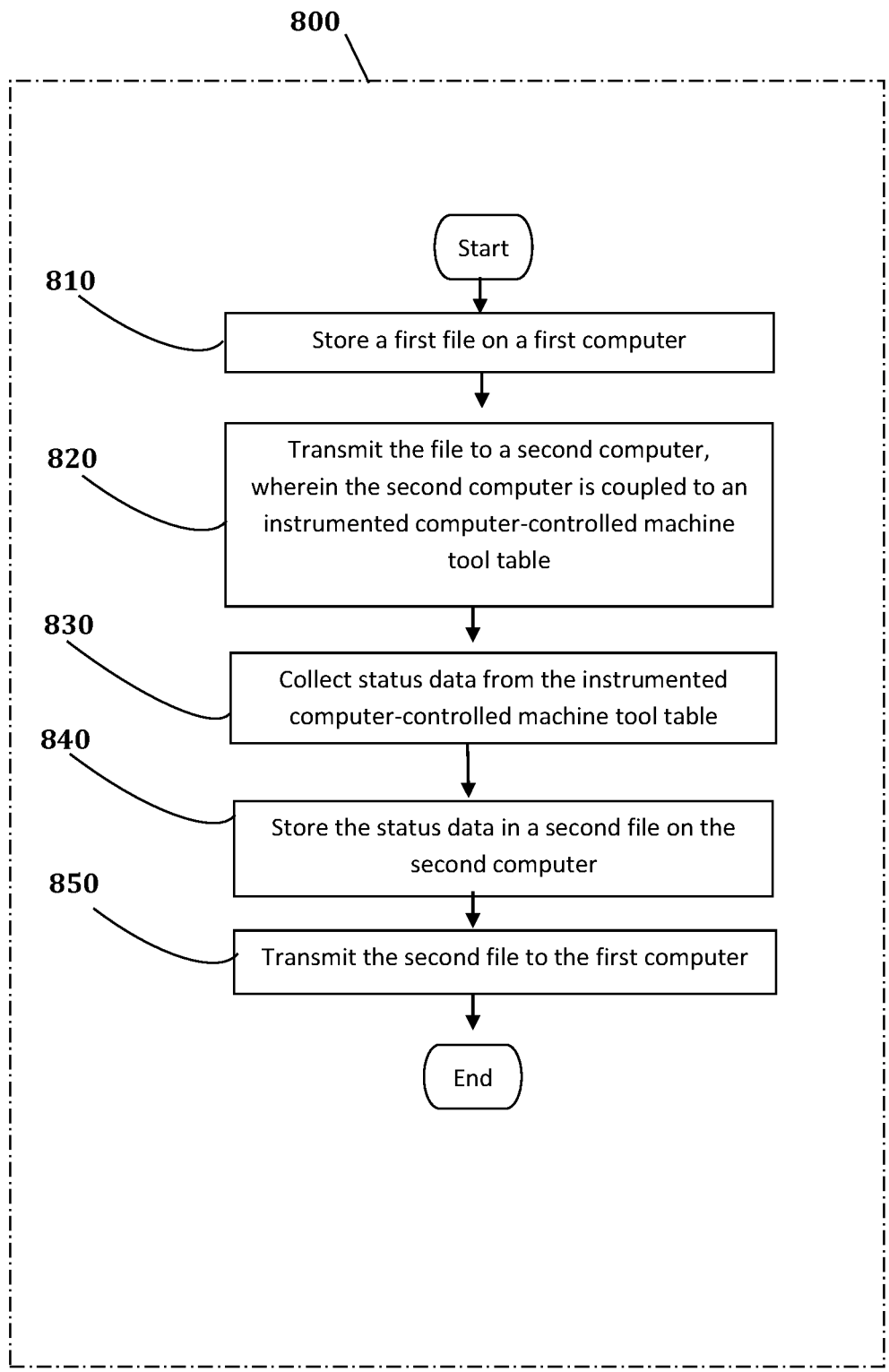
FIG. 8 is an execution diagram illustrating a method for sharing files for computer-assisted setup of an instrumented machine tool table.

FIG. 8 is an execution diagram 800 performed according to another embodiment of the present invention, illustrating a method for sharing a file for purposes of setting up a machine tool table. This method may be characterized as a "closed-loop feedback system" in that files are shared for purposes of having a first user, such as a designer, control an instrumented computer-controlled machine tool table using a first file, and whereby data received from the instrumented computer-controlled machine tool table constitutes a second file, thus providing closed-loop feedback data sent back to the designer. Starting at block 810, the method includes the step of storing a first file on a first computer. For example, the first computer may be a computer associated with a designer, and the file may comprise data related to setup of the machine tool table. At block 820, the method also includes the step of transmitting the file to a second computer, which second computer may be associated with a machinist, wherein the second computer is coupled to an instrumented computer-controlled machine tool table. At block 830, the method also includes the step of collecting status data from the instrumented computer-controlled machine tool table. At block 840, the method also includes the step of storing the status data on a second file on the second computer. At block 850, the method also includes the step of transmitting the second file to the first computer thereby providing closed-loop feedback to the designer.

Figure 9:
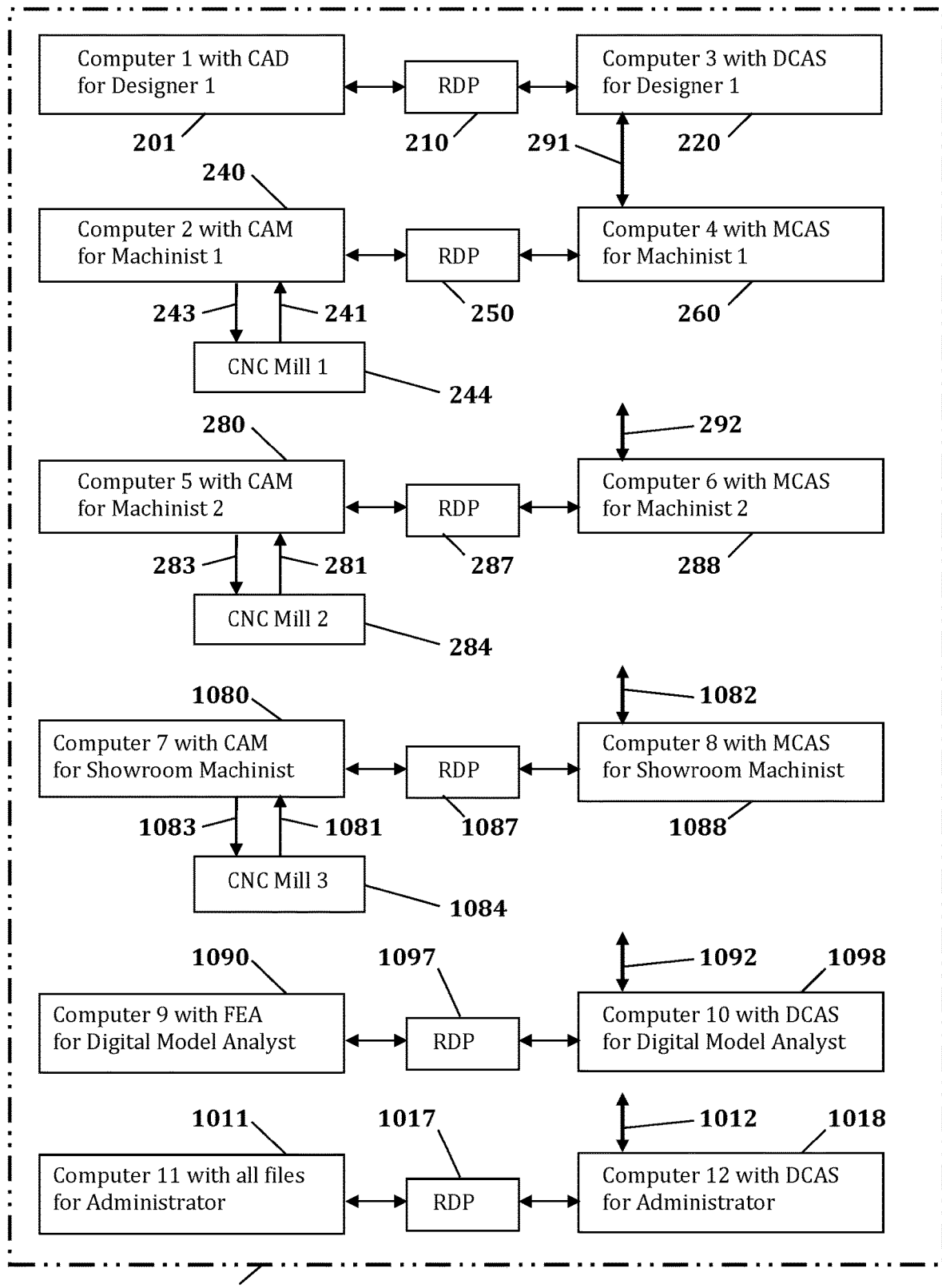
FIG. 9 is a computer system with the CAS infrastructure architecture.

FIG. 9 shows a computer system according to the present invention, whereby twelve computers make up the CAS infrastructure architecture 1000. Computer 1 201 has a CAD program used by Designer 1; Computer 2 240 has a CAM program used by Machinist 1; Computer 3 220 has a DCAS program used by Designer 1; Computer 4 260 has an MCAS program used by Machinist 1; Computer 5 280 has a CAM program used by Machinist 2; Computer 6 288 has an MCAS program used by Machinist 2; Computer 7 1080 has a CAM program used by a Showroom Machinist; Computer 8 1082 has an MCAS program used by a Showroom Machinist; Computer 9 1090 has an FEA program used by a Digital Model Analyst; Computer 10 1092 has a DCAS program used by a Digital Model Analyst; Computer 11 1011 has all the files required for use by an Administrator; and Computer 12 1012 has a DCAS program used by an Administrator. Computer 1 201, Computer 2 240, Computer 5 280, Computer 7 1080, Computer 9 1090, and Computer 11 1011 are each coupled to a corresponding MCAS or DCAS computer via a digital network 210, 250, 287, 1087, 1097, 1017 using RDP or similar networking protocol. Data exchange between Computer 3 220, Computer 4 260, Computer 6 288, Computer 8 1082, Computer 10 1098, and Computer 12 1018 occurs over a digital network 291, 292, 1082, 1092, 1012.

INDUSTRIAL APPLICABILITY

The present invention pertains generally to the exchange of electronic files during computer assisted setup of instrumented machine tool tables or during real estate transactions, which may be of value or importance to various industries, such as, but not limited to, parts manufacturing and real estate.

What is claimed is:

1. A system for setup of an instrumented machine tool table, the system comprising:
  a first computer having one or more computer-aided design (CAD) functions and associated with a first user;
  a second computer having one or more computer-aided manufacturing (CAM) functions and associated with a second user;
  an instrumented computer-controlled machine tool table having at least one sensor for measuring a physical state of the instrumented computer-controlled machine tool table and coupled to the second computer, wherein the instrumented computer-controlled machine tool table is configured to receive input from the second computer and configured to transmit data related to the physical state of the instrumented computer-controlled machine tool table to the second computer; and
  a third computer, coupled to the first computer via one or more digital networks, wherein the third computer comprises software configured to allow the first user to interact with data related to the physical state of the instrumented computer-controlled machine tool table; and
  a fourth computer, coupled to the second computer via the one or more digital networks, wherein the fourth computer comprises software configured to allow the second user to interact with data related to the physical state of the instrumented computer-controlled machine tool table and wherein the second computer is configured to transmit data related to the physical state of the instrumented computer-controlled machine tool table to the fourth computer, the fourth computer is configured to transmit data related to the physical state of the instrumented computer-controlled machine tool table to the third computer, and the third computer is configured to transmit data related to the physical state of the instrumented computer-controlled machine tool table to the first computer.

2. The system of claim 1, further comprising:
a fifth computer having the one or more CAM functions and associated with a third user;
a second instrumented computer-controlled machine tool table having at least one sensor for measuring a second physical state of the second instrumented computer-controlled machine tool table and coupled to the fifth computer, wherein the second instrumented computer-controlled machine tool table is configured to receive input from the fifth computer and configured to transmit data related to the second physical state of the second instrumented computer-controlled machine tool table to the fifth computer; and
a sixth computer, coupled to the fifth computer via the one or more digital networks, wherein the fifth computer is configured to transmit data related to the second physical state of the second instrumented computer-controlled machine tool table to the sixth computer, the sixth computer is configured to transmit data related to the second physical state of the second instrumented computer-controlled machine tool table to the third computer, and the third computer is configured to transmit data related to the second physical state of the second instrumented computer-controlled machine tool table to the first computer.

3. The system of claim 2, further comprising:
a seventh computer having the one or more CAM functions and associated with a fourth user;
a third instrumented computer-controlled machine tool table having at least one sensor for measuring a third physical state of the third instrumented computer-controlled machine tool table and coupled to the fifth computer, wherein the third instrumented computer-controlled machine tool table is configured to receive input from the seventh computer and configured to transmit data related to the third physical state of the third instrumented computer-controlled machine tool table to the seventh computer;
an eighth computer, coupled to the seventh computer via the one or more digital networks, wherein the seventh computer is configured to transmit data related to the third physical state of the third instrumented computer-controlled machine tool table to the eighth computer, the eighth computer is configured to transmit data related to the third physical state of the third instrumented computer-controlled machine tool table to the third computer, and the third computer is configured to transmit data related to the third physical state of the third instrumented computer-controlled machine tool table to the first computer;
a ninth computer having functions for analysis of digital models and associated with a fifth user;
a tenth computer, coupled to the ninth computer via the one or more digital networks, wherein the tenth computer is configured to transmit data to the third computer;
an eleventh computer having administrator file storage functions and associated with a sixth user; and
a twelfth computer, coupled to the eleventh computer via the one or more digital networks, wherein the twelfth computer is configured to transmit data to the third computer.

4. The system of claim 1, further comprising:
a non-transitory computer readable storage medium with instructions, executed by at least one of the first computer or the second computer, to:
transmit a CAD data file from the first computer to the second computer;
control the instrumented computer-controlled machine tool table according to the CAD data file;
receive a machine tool table state data set comprising data from the at least one sensor on the instrumented computer-controlled tool table; and
transmit the machine tool table state data set to the first computer.

5. The system of claim 4, wherein the machine tool table state data set comprises at least one value selected from the group consisting of a coordinate value or an axis direction value.

6. The system of claim 4, wherein the machine tool table state data set comprises at least one value collected by at least one sensor selected from the group consisting of a coordinate probe, an environmental sensor, a table tilt sensor, or a host for determining orthogonal axes.

7. The system of claim 1, further comprising a non-transitory computer readable storage medium with an artificial intelligence program for analyzing data from the at least one sensor on the instrumented computer-controlled tool table.

8. The system of claim 1, wherein the third computer is a remote personal computer coupled to the first computer via remote desktop protocol and the fourth computer is a remote personal computer coupled to the second computer via remote desktop protocol.

9. A method of setting up instrumented computer-controlled machine tool tables, the method comprising the steps of:
Storing a first file on a first computer associated with a first user;
Transmitting the first file to a second computer associated with a second user and coupled to a first instrumented computer-controlled machine tool table, wherein operation of the first instrumented computer-controlled machine tool table is at least partially determined by the first file;
Collecting status data from the first instrumented computer-controlled machine tool table;
Storing the status data from the first instrumented computer-controlled machine tool table in a second file on the second computer;
Transmitting the second file to the first computer;
Transmitting the first file to a third computer associated with a third user and coupled to a second instrumented computer-controlled machine tool table, wherein operation of the second instrumented computer-controlled machine tool table is at least partially determined by the first file;
Collecting status data from the second instrumented computer-controlled machine tool table;
Storing the status data from the second instrumented computer-controlled machine tool table in a third file on the third computer; and
Transmitting the third file to the first computer.

10. The method of claim 9 further comprising the step of transmitting the first file to at least one additional computer.

11. The method of claim 9, wherein the file comprises an engineering drawing related to a fabricated part and further comprising the step of converting the file to a digital image file.

12. The method of claim 9, wherein the first computer and second computer are remote personal computers and further comprising the steps of:

Connecting remotely to the first computer by a first user; and

Connecting remotely to the second computer by a second user associated with the instrumented computer-controlled machine tool table.

13. The method of claim 9, wherein the status data comprises at least one value selected from the group consisting of a coordinate value or an axis direction value.

14. The method of claim 9, wherein the status data comprises at least one value collected by at least one sensor selected from the group consisting of a coordinate probe, an environmental sensor, a table tilt sensor, or a host for determining orthogonal axes.

15. The method of claim 9 further comprising the step of processing the status data by an artificial intelligence program.

16. The method of claim 9, wherein the first file and the second file each comprise coordinate data related to vise and block inspection and further comprising the step of calculating refined coordinate positions.

17. The method of claim 9, wherein the method is for purposes of recovering from an earthquake and further comprising the steps of:

Analyzing the status data to identify any changes to the state of the instrumented computer-controlled machine tool table caused by the earthquake, wherein the status data comprises at least one value selected from the group consisting of a table tilt value or an axis direction value; and Restoring the instrumented computer-controlled machine tool table to its state prior to the earthquake.

\* \* \* \* \*